United States Patent Office 3,507,808
Patented Apr. 21, 1970

3,507,808
NOVEL PEROXIDE COMPOSITIONS
Robert M. Douglas, Harrington Park, Michael Erchak, Jr., Ridgewood, and Kenneth W. Doak, Wyckoff, N.J., assignors to Dart Industries Inc., a corporation of Delaware
No Drawing. Continuation-in-part of application Ser. No. 362,985, Apr. 27, 1964. This application Apr. 12, 1968, Ser. No. 721,078
Int. Cl. C08d *3/04*
U.S. Cl. 252—426          4 Claims

ABSTRACT OF THE DISCLOSURE

A solid substantially solvent-free peroxide composition of reduced shock sensitivity is disclosed which comprises up to 95 mole percent of benzoyl peroxide recrystallized from solution with at least 5 mole percent of decanoyl peroxide.

CROSS-REFERENCE TO RELATED APPLICATION

This application is a continuation-in-part of application Ser. No. 362,985, filed Apr. 27, 1964, now abandoned.

BACKGROUND OF INVENTION

Field of the invention

This invention relates to novel compositions comprising a mixture of solid peroxides and to a process for preparing them.

Description of prior art

Heretofore in ethylenically unsaturated monomer polymerizations it has been customary to employ peroxide initiators in some type of a solvent polymerization medium. A large variety of peroxide (free radical initiators) compositions have been employed in both low and high temperature polymerizations involving monomers such as ethylene, styrene, acrylonitrile and the like. One of the most outstanding and useful peroxides heretofore known has been benzoyl peroxide, usually alone, but in many instances in combination with at least one or more other organic peroxide compositions in solution.

One of the problems associated with the use of benzoyl peroxide has been the very sensitive nature of this peroxide to shock. When exposed to shock, benzoyl peroxide is known to decompose rapidly with violence. Thus, usually in the literature it is always cautioned that this particular peroxide be handled carefully. There have been provided in the past various safety procedures for handling this material. Thus, since the dry benzoyl peroxide cannot be readily handled without danger of its decomposing by shock or heat, usually when it is stored or transferred for long distances, it is customary to didlute it with either solids such as stearic acid or liquids such as water or plasticizers, for example, tricresyl phosphate, dibutyl phthalate or silicon fluid, etc. in order to reduce its shock sensitivity and to be able to handle it efficiently. While these methods of compounding benzoyl peroxide to form pastes, solids or liquids are currently in commercial usage, specifically for shipping the peroxide in containers to the various places of usage, it sometimes poses a problem to the user of the peroxide in that the peroxide may have to be recovered from its compounded ingredients for the particular use intended.

Recently a high pressure process for polymerizing ethylene has been developed which employs as initiating compositions two or more peroxides, such as benzoyl peroxide with decanoyl peroxide or additionally with a third, fourth and even a fifth peroxide composition which is used in the high pressure polymerization reaction for preparing solid polyethylene. However, the commercial use of benzoyl peroxide in this process has been limited because of its shock sensitivity and because of shipping problems. The usual method for shipping benzoyl peroxide is in small containers which may require the shipment of a large number of such containers. Moreover, the benzoyl peroxide comes compounded as noted heretofore with inert compositions for reducing the shock sensitivity and such inert compositions may have to be separated from the peroxide prior to its use in ethylene polymerizations. Obviously, it would be highly desirable, specifically in the high pressure polyethylene process mentioned above or in those sytrene polymerization reactions involving more than one peroxide or others, if benzoyl peroxide could be used directly without prior steps of recovering from unneeded inert compositions or if transportation and storage problems could be alleviated. This is so, because benzoyl peroxide is more economical to use than other more expensive peroxides, since its initiating activity is equivalent to and in many cases better than some of the higher priced peroxides.

SUMMARY OF THE INVENTION

An object of this invention is the provision of a process for the preparation of benzoyl peroxide compositions of reduced shock sensitivity.

A further object of this invention is the provision of a novel benzoyl peroxide composition comprising at least one additional solid peroxide, said composition being of reduced shock sensitivity and useful in chemical polymerization reactions requiring the use of dual or multiple peroxides.

A still further object of this invention is a process for preparing the foregoing novel benzoyl peroxide compositions.

Another object of this invention is the provision of a benzyl peroxide composition containing an additional solid peroxide, which additional peroxide is capable of reducing the shock sensitivity of benzoyl peroxide and thus providing a composition containing an additional free radical source for use in a polymerization without incorporating an inert material.

These objects are accomplished in a broad embodiment of this invention by providing a solid peroxide composition of reduced shock sensitivity comprising benzoyl peroxide recrystallized from solution with an additional solid peroxide which is decanoyl peroxide. The peroxide composition may also contain a liquid peroxide or mixture of liquid peroxides. The benzoyl peroxide compositions are prepared according to a novel process which comprises dissolving benzoyl peroxide and decanoyl peroxide in a hydrocarbon solvent and thereafter recrystallizing the dissolved peroxide compositions by removal, by evaporation or otherwise, of the hydrocarbon solvent and drying the benzoyl peroxide-containing composition. It was surprisingly found that benzoyl peroxide recrystallized from solution with decanoyl peroxide resulted in a composition of reduced shock sensitivity as will be illustrated in the specific examples to be presented hereinbelow.

It is not certain why the recrystallization of benzoyl peroxide with decanoyl peroxide results in a composition of reduced shock sensitivity. However, it is believed that the crystal lattice of benzoyl peroxide is sufficiently hindered or modified in some manner by recrystallization with decanoyl peroxide so that the shock sensitivity of the resulting composition is reduced to a point where it can be safely handled.

PREFERRED EMBODIMENT OF THIS INVENTION

The process of this invention can briefly be described as one wherein benzoyl peroxide is dissolved in a hydrocarbon solvent and decanoyl peroxide and possibly a liquid peroxide in certain molar amounts is also dissolved therein and the solvent is thereafter removed and the peroxide compositions dried to obtain a dry flowable solid powder, or a paste when a liquid peroxide or peroxides are present, which is transformed from a shock-sensitive material in its single form to one of reduced shock sensitivity. The tests to be described hereinafter for determining the reduction of shock sensitivity of a 2, 3, 4 or 5 component peroxide composition will show that a much higher energy impact can be absorbed by the novel compositions without ignition or explosion. In view of this, therefore, it is readily possible to ship benzoyl peroxide compositions in larger packaged quantities, and such compositions can be used almost directly from a container by adding them to the polymerization reaction as desired. A typical ethylene polymerization employing three or four peroxide components will be illustrated hereinafter in accordance with the new process developed as indicated above.

The solvents for use in preparing the compositions of reduced shock sensitivity are suitably hydrocarbon solvents such as paraffinic hydrocarbons including normally liquid compounds such as pentane, hexane, heptane, octane, cyclohexane or aromatic hydrocarbons such as benzene, toluene, xylene or mixtures of aromatic and paraffinic hydrocarbons.

The amount of peroxide compositions on a molar basis added to the solvent can obviously be up to the limit of the saturation of the solvent or as low as desired, so long as the peroxides can be recovered from such hydrocarbon solvents after evaporation with a minimum of dissociation. The amount of decanoyl peroxide to achieve a significant reduction of the shock sensitivity of the benzoyl peroxide should be at least 5 mole percent. A broad range for such benzoyl peroxide compositions on a molar solvent-free basis is from 10 to 95 mole percent benzoyl peroxide, but preferably from 20 to 80 mole percent.

While hydrocarbon solvents have been described as useful for the recrystallization of benzoyl peroxide with at least one other solid peroxide, it is obvious that other solvents which will dissolve other solid peroxides and recrystallize them in substantially the same manner can likewise be used.

Various types of commercially available liquid peroxides, i.e., peroxides which are liquid at room temperature, can also be included in the peroxide compositions of this invention in amounts up to about 100 moles per 100 moles of benzoyl peroxide. Exemplary of such liquid peroxides include p-chlorobenzoyl peroxide; t-butyl peroxy pivalate; t-butyl peracetate; t-butyl perbenzoate; di-t-butyl peroxide; t-butyl peroxyisobutyrate; methyl ethyl ketone peroxides; di-t-butyl diperphthalate; 2,5-dimethyl - 2,5 - di(t-butylperoxy) hexane; and t-butyl hydroperoxide.

There is nothing too critical with respect to temperatures of the recrystallization of the peroxide compositions in the hydrocarbon or other solutions, except that obviously high temperatures which might cause excessive decompositions of the peroxides in solution should not be used (the half-life temperature range of the particular peroxide and the exothermal heat of reaction should therefore be taken into account). Normal ambient temperatures such as from room temperature or below to 0° F. and up to approximately 100° F. are usually satisfactory (the particular lower temperatures depending upon the freezing point and the solubility of the peroxide in the solvent used).

Recrystallization occurs rapidly upon evaporation of the solvent and the residue remaining can be substantially dried by using a vacuum oven or any other means available so that a substantially dry free-flowing solid powder is obtained as the preferred form of the peroxide compositions of this invention.

The following examples illustrate the method for preparing the novel compositions herein and also their utility in ethylenically unsaturated monomer polymerizations.

EXAMPLE 1

In order to determine preliminarily the relative shock sensitivity of dry benzoyl peroxide, the following test was performed:

Benzoyl peroxide was dried for one hour in a vacuum oven. Approximately 0.1 gram samples were placed on a polished steel anvil, some in an aluminum foil cup (Part A) and some in a small pile (Part B). A polished steel plug was placed on top of the material and struck with a 20 ounce head carpenter's hammer. The following results were obtained.

Part A.—Dry benzoyl peroxide placed in aluminum foil cup

| Test: | Number of blows for Ignition (detonation) |
|---|---|
| 1 | 3 |
| 2 | 4 |
| 3 | 2 |
| 4 | 3 |
| 5 | 3 |

Average number of blows for ignition—3.

By ignition or detonation is meant that substantially all the peroxide was dissipated as a smoke upon striking with the hammer.

Part B.—Ory benzoyl peroxide in a small pile on the anvil

| Test: | Number of blows for detonation |
|---|---|
| 1 | 1 |
| 2 | 1 |
| 3 | 1 |

EXAMPLE 2

A 1 to 1 molar mixture of decanoyl peroxide and benzoyl peroxide was dissolved in benzene and hexane. The solvent was evaporated and the recrystallized composition allowed to stand overnight in a vacuum dessicator at room temperature. An 0.1 gram sample was tested in the same manner as in Example 1 and resulted in 20 blows without detonation (no aluminum foil cup).

EXAMPLE 3

The same mixture as in Example 2 was dissolved in benzene/toluene, recrystallized and dried, A 0.1 gram sample was then tested as before with no aluminum foil, with the following result: 20 blows—no ignition.

EXAMPLE 4

Since there is a possibility that benzoyl peroxide may recrystallize out first from a hydrocarbon solution, about ¼ to ⅓ of the solids were allowed to recrystallize out from a solution of initiators as in Example 2 and then the liquid poured off and the solids dried. Tests on 0.1 gram samples using the previous procedure yielded the following results: 20 blows—no ignition.

The foregoing demonstrate that benzoyl peroxide and decanoyl peroxide can be recrystallized together and thereby the shock sensitivity of benzoyl peroxide is reduced specifically with reference to the method of determining this as set forth above.

EXAMPLE 5

To more accurately determine the reduction in shock sensitivity of benzoyl peroxide by adding decanoyl peroxides to its, the tests were run with a drop test apparatus capable of dropping a 20 pound weight over a measurable distance of up to 36 inches. A two piece anvil was made in such a manner that the powder to be tested was placed between two flat steel surfaces which were held parallel. These two surfaces were forced together by the impact of the falling 20 pound weight from a set height.

The following tests were run with benzoyl peroxide as received from the manufacturer and dried 2 days in a vacuum dessicator. Sample weight 0.1 gram for each test.

| Distance in inches for the weight fall: | Result |
|---|---|
| 20 | + |
| 19 | + |
| 18 | + |
| 17 | + |
| 16 | + |
| 15 | + |
| 14 | + |
| 13 | + |
| 12 | + |
| 11 | + |
| 10 | + |
| 10 | 0 |
| 9 | + |
| 8 | + |
| 7 | 0 |
| 8 | 0 |
| 9 | + |
| 8 | 0 |
| 9 | + |
| 8 | 0 |
| 9 | 0 |

0 = no detonation
+ = detonation

The above tests represent a 50% detonation value for a value for a height of 8 to 9 inches. Above about 10 inches the benzoyl peroxide detonated rather consistently.

EXAMPLE 6

Following the above test with benzoyl peroxide, the weight was set at the height of 36 inches and the following tests were run on different aliquots of the same stated compositions:

(a) A mixture of 95 mole percent benzoyl peroxide and 5 mole percent decanoyl peroxide was dissolved in benzene and evaporated rapidly. The recrystallized composition was dried 2 days in vacuum dessicator. One test was made at 36 inches and the material did detonate although very feebly compared to the pure benzoyl peroxide (no smoke was detected and only part of the sample showed evidence of detonation by having a yellowish stain. The same applied to all other feeble detonations noted below).

(b) A mixture similar to that above was made with 90 mole percent benzoyl peroxide and 10 mole percent decanoyl peroxide and tested 20 times at 36 inches with three very feeble detonations.

(c) A similar test was made with 85 mole percent benzoyl peroxide and 15 mole percent decanoyl peroxide. The recrystallized composition was tested 20 times at 36 inches with four very feeble detonations.

(d) A similar test was made with 75 mole percent benzoyl peroxide and 25 mole percent decanoyl peroxide. The recrystallized composition was tested 20 times with no detonations occurring.

(e) A 90 mole percent benzoyl peroxide, 10 mole percent decanoyl peroxide mechanical mixture was tested 10 times with one feeble detonation. The intimately mixed peroxides were of small particle size.

As noted in Example 8(e) above, where an intimate mixture of two solid powdered peroxides is made and tested, there is some improvement in the shock sensitivity reduction of the benzoyl peroxide. However, the greatest improvement in the shock sensitivity reduction of benzoyl peroxide occurs with the recrystallization technique of this invention.

As indicated heretofore, the compositions as presented above can be used directly for ethylenically unsaturated monomer polymerizations.

Although the novel compositions described above are useful in ethylene polymerizations, other polymerizations as indicated can also be performed with such peroxide compositions. Further, while particular and preferred embodiments of the invention have been described, it is obvious that modifications can be made to this invention without departing from its scope.

What is claimed is:

1. A solid substantially solvent-free peroxide composition of reduced shock sensitivity comprising up to 95 mole percent of benzoyl peroxide recrystallized from solution with at least 5 mole percent of decanoyl peroxide.

2. The composition of claim 1 in admixture with a liquid peroxide.

3. The invention according to claim 2 wherein the liquid peroxide is t-butyl peroxypivalate or a combination of t-butyl peracetate and di-t-butyl peroxide.

4. The composition of claim 1 wherein 20 to 80 mole percent of benzoyl peroxide is recrystallized from solution with about 20 to 80 mole percent of decanoyl peroxide.

References Cited

UNITED STATES PATENTS

| 2,858,326 | 10/1958 | Ashby | 252—426 XR |
| 3,015,631 | 1/1962 | McCloskey | 252—426 |
| 3,181,991 | 5/1965 | Leveskis | 252—426 XR |
| 3,231,542 | 1/1966 | Eisinger et al. | 252—426 XR |

PATRICK P. GARVIN, Primary Examiner

U.S. Cl. X.R.

260—94.9